June 1, 1954  H. N. STEPHAN  2,679,678
HORIZONTAL BORING, DRILLING, AND MILLING MACHINE
Filed Jan. 23, 1951  7 Sheets-Sheet 1

INVENTOR.
HALLIS N. STEPHAN
BY Hudson Boughton,
Williams, David & Hoffmann
ATTORNEYS June 1, 1954 H. N. STEPHAN 2,679,678
HORIZONTAL BORING, DRILLING, AND MILLING MACHINE
Filed Jan. 23, 1951 7 Sheets-Sheet 2

INVENTOR.
HALLIS N. STEPHAN
BY Hudson, Boughton,
Williams, David & Hoffmann
ATTORNEYS June 1, 1954     H. N. STEPHAN     2,679,678
HORIZONTAL BORING, DRILLING, AND MILLING MACHINE
Filed Jan. 23, 1951     7 Sheets-Sheet 4

INVENTOR.
HALLIS N. STEPHAN
Hudson, Brighton
Williams, Davis & Hoffmann
ATTORNEYS June 1, 1954   H. N. STEPHAN   2,679,678
HORIZONTAL BORING, DRILLING, AND MILLING MACHINE
Filed Jan. 23, 1951   7 Sheets-Sheet 5

INVENTOR.
HALLIS N. STEPHAN
ATTORNEYS

INVENTOR.
HALLIS N. STEPHAN

Patented June 1, 1954

2,679,678

UNITED STATES PATENT OFFICE 2,679,678

HORIZONTAL BORING, DRILLING, AND MILLING MACHINE

Hallis N. Stephan, Cleveland Heights, Ohio, assignor to The New Britain Machine Company, New Britain, Conn., a corporation of Connecticut Application January 23, 1951, Serial No. 207,403

3 Claims. (Cl. 29—26)

The present invention relates to all types of combined boring, drilling and milling machines, including so-called horizontal boring machines, jigmills, jig borers, etc., and, more particularly, to the mechanism for controlling the movements of the various machine tool elements thereof.

The principal object of the invention is the provision of a novel and improved, combined boring, drilling and milling machine, including a single control member mounted for universal movement and capable of controlling the relative movement between two of the machine tool elements movable at right angles relative to each other in such a manner that the machine tool elements move relative to each other in the direction or approximate direction that the control member is moved.

The invention resides in certain constructions and combinations and arrangements of parts and further objects and advantages thereof will be apparent to those skilled in the art to which the invention relates from the following description of the preferred embodiment described with reference to the accompanying drawings forming a part of this specification, in which similar reference characters designate corresponding parts, and in which Fig. 1 is a perspective view of a combined horizontal boring, drilling and milling machine embodying the present invention;

Figure 1:
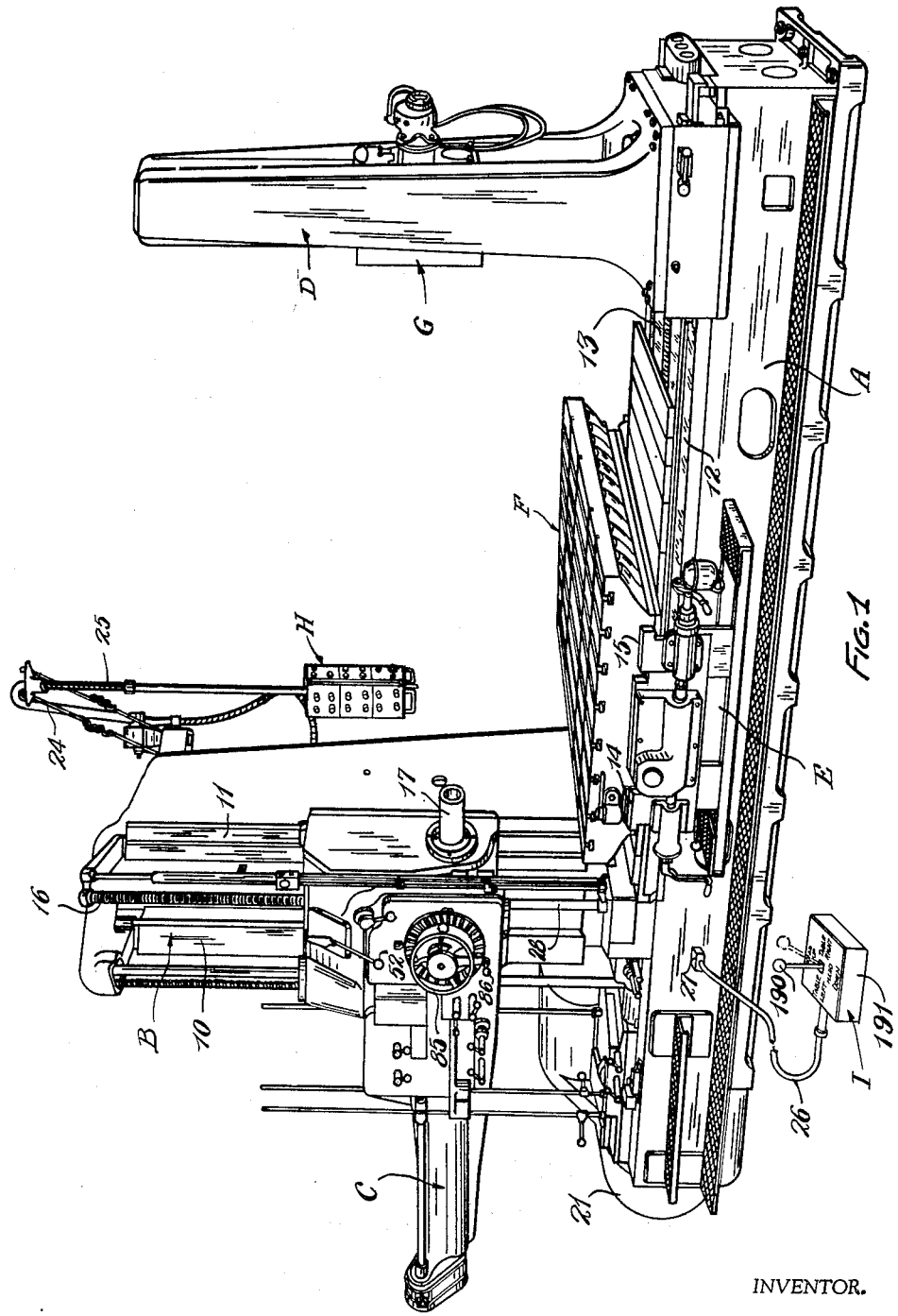

Referring to the drawings, the machine shown therein comprises a base A, provided at one end with a spindle head column B formed with vertical ways 10 and 11 upon which a spindle head C is mounted for vertical movement, and at the other end with a backrest or outboard support column D slidably supported on horizontal ways 12 and 13 formed on the upper side of the bed. The ways 12 and 13 also support a saddle E having transverse horizontal ways 14 and 15 on the upper side which in turn support a work table F. The backrest column D is provided with vertical ways upon which a backrest block G is mounted for vertical movement.

The spindle head is adapted to be moved vertically along the ways 10 and 11 by a lead screw 16 rotatably supported in the machine in a suitable manner and having threaded engagement with a nut fixed in the spindle head. In addition to being rotatable in opposite directions, the tool spindle 17 is movable in opposite directions longitudinally of its axis of rotation at different speeds to effect both feed and rapid movements. The backrest block or outboard support G is movable simultaneously with the movement of the spindle head C by a vertical lead screw 18 located within the backrest column D and connected to the drive for rotating the screw 16. The saddle E is movable longitudinally of the tool spindle along the ways 12 and 13 and the table F is movable transversely of the tool spindle along the ways 14 and 15 at different speeds by mechanism hereinafter specifically referred to.

The speed and direction of rotation of the spindle, etc., and the aforesaid movements of the various machine tool elements, such as the feed and rapid movements of the spindle, head, saddle, table, etc., are performed by power and their operation may be controlled from any convenient place about the machine. The machine illustrated includes a reversible spindle drive motor 20 arranged for ceiling mounting and enclosed within the guard 21 adjacent to the left-hand end of the machine, a reversible feed motor 22 also located within the guard 21, and a reversible spindle rapid traverse motor 23 mounted on the spindle head C. Other motors are employed but their location and operation are not necessary to an understanding of the present invention.

The spindle drive motor 20 produces the spindle rotation and spindle feed movements. The feed motor 22 produces the feed and rapid movements of the spindle head C, saddle E and table F. The spindle rapid motor 23 produces the rapid movement of the spindle. The motors referred to are selectively connected to the various operating mechanisms through the medium of suitable speed change transmissions, clutches, etc., the controls for which are located on or adjacent to the base A of the machine, spindle head C, pendant control station H fixed to the lower end of a tubular rod connected to a universally movable arm 24 by a flexible cable 25, and/or a portable control station I connected to the free end of a flexible cable 26, the other end of which is plugged into an outlet 27 in the base A of the machine.

Figures 2, 5:
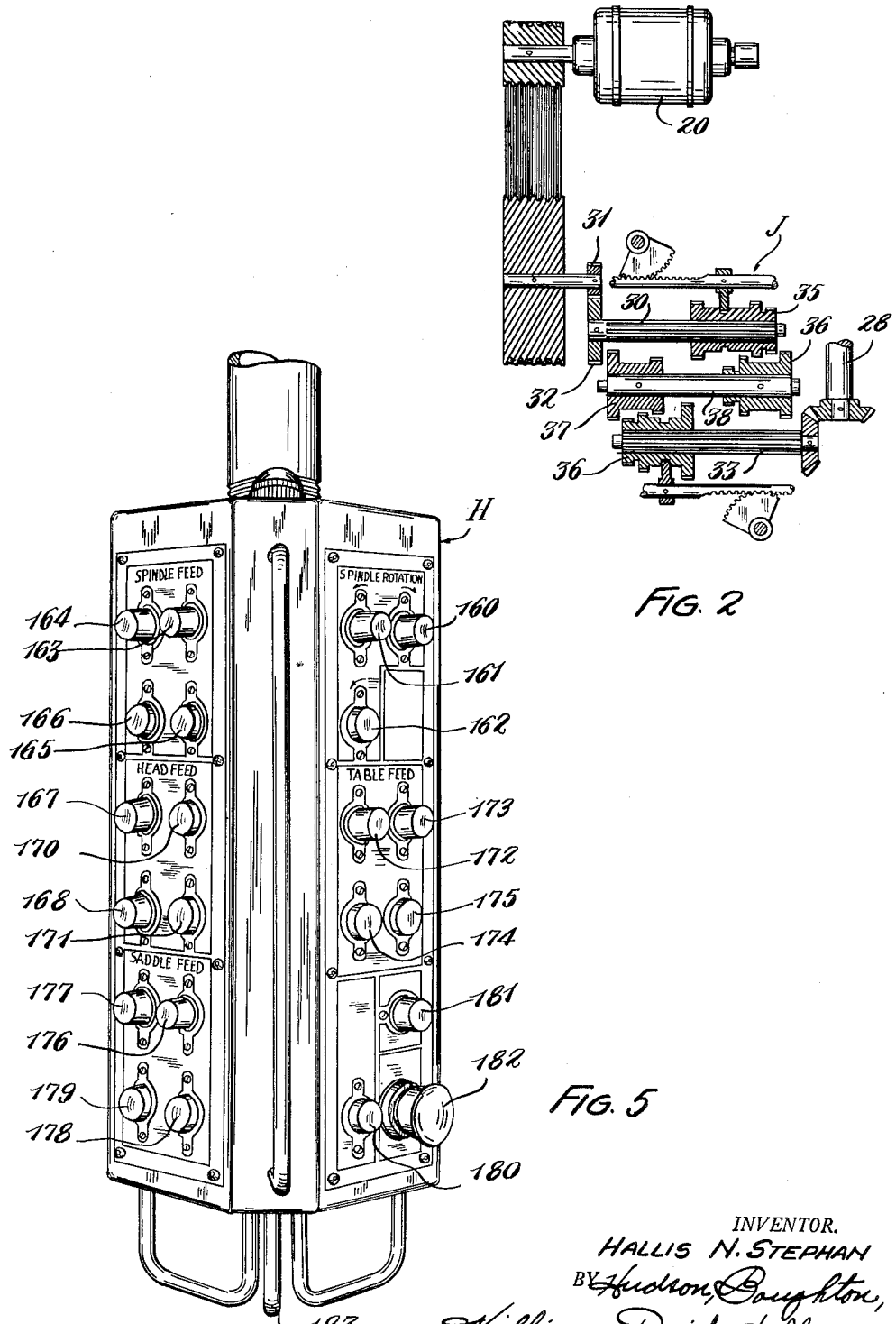
Fig. 2 is a diagrammatic view of that portion of the drive for the tool spindle which is located in the base of the machine.
Fig. 5 is an enlarged perspective view of the pendant control station.
Figure 3:
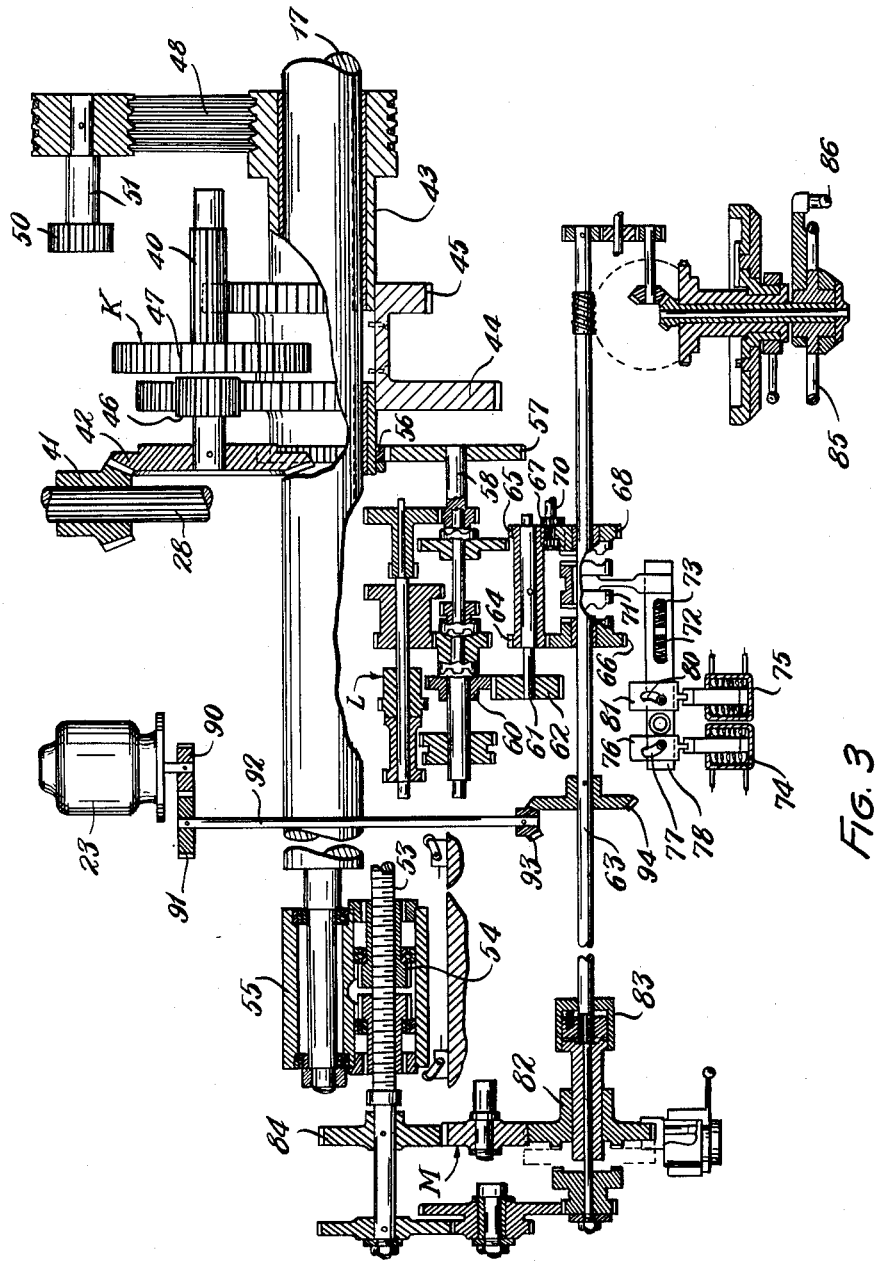
Fig. 3 is a diagrammatic view of the portion of the drive for the tool spindle which is located in the spindle head.

The spindle 17 is adapted to be rotated at various rates of speed by the spindle drive motor 20 through the medium of speed change gearing, designated generally by the reference character J, see Fig. 2, housed in a suitable gear box supported in the bed of the machine; a vertical shaft 28, the lower end of which is rotatably supported in the gear box while the upper end is supported in the head column B; and back gears, designated generally by the reference character K located in the spindle head C. The motor 20 is connected to the driven shaft 30 of the speed change transmission J by a V-belt drive and spur gears 31 and 32, the former of which is fixed to a shaft carrying the driven pulley of the V-belt drive while the latter is fixed to the shaft 30. The driving shaft 33 of the transmission J is connected to the lower end of the vertical shaft 28 by miter gears. The speed change transmission J provides nine different speeds and comprises gear clusters 34 and 35 slidably supported on the shafts 30 and 33, respectively, and adapted to cooperate with gear clusters 36 and 37 fixed to an intermediate shaft 38.

The gear clusters 34 and 35 are adapted to be shifted lengthwise of the shafts 30 and 33 upon which they are slidably splined to obtain the various speeds by any suitable mechanism. The particular mechanism employed forms no part of the present invention per se and is not illustrated and described herein in detail.

The driven shaft 40 of the back gears K is rotatably supported in the spindle head and is connected to the upper end of the vertical shaft 28 by a bevel gear 41 carried by the spindle head and splined to the shaft 28. The bevel gear 40 meshes with a bevel gear 42 fixed to the left-hand end of the shaft 40. The spindle 17 is slidably keyed within a spindle quill 43 rotatably supported by suitable bearings in the spindle head C, which spindle quill has a gear cluster comprising the gears 44 and 45 fixed thereto. The gears 44 and 45 are adapted to be selectively engaged by gears 46 and 47, respectively, of a gear cluster splined to the shaft 40. A high speed drive is obtainable through the medium of a V-belt final drive 48 when the gear 47 is shifted into engagement with a gear 50 fixed to a short shaft 51 journaled in the spindle head, which shaft carries the driving pulley of the V-belt drive 48. The gear cluster comprising the gears 46 and 47 is adapted to be shifted along the shaft 40 by a hand lever 52 fixed to the front end of a horizontal shaft journaled in the spindle head, the rear end of which shaft carries a yoke member engageable with the gear cluster.

The spindle 17 is adapted to be fed or rapid traversed in either direction by a lead screw 53 rotatably supported in the spindle head extension and having threaded engagement with a two-piece nut 54 located within the feed slide 55 adjacent to the left-hand end of the spindle 17 and connected thereto in a suitable manner. The lead screw 53 is adapted to be rotated in either direction and at different speeds from the spindle quill 43 through the medium of spur gears 56 and 57, the former of which is fixed to the left-hand end of the spindle quill while the latter is fixed to the right-hand end of a shaft 58 journaled in the spindle head and which forms the driving shaft of a feed speed change transmission, designated generally by the reference character L, housed within a suitable gear box in the spindle head. The gear 60 which forms the driving element of the feed change transmission L is operatively connected to a horizontal shaft 61 journaled in the spindle head through the medium of a gear 62 fixed to the left-hand end of the shaft 61.

The shaft 61 is adapted to be operatively connected to a horizontal shaft 63 journaled in the spindle head and extending substantially the length thereof through the medium of gears 64 and 65 of a gear cluster fixed to the shaft 61. The gear 64 is in mesh with a gear 66 journaled on the shaft 63 and the gear 65 with a gear 67 which in turn meshes with a gear 68 also journaled on the shaft 63. The gear 67 is journaled on a jack shaft 70 and the gear 68 rotates in a direction of rotation of the gear 66. The gears 66 and 68 are adapted to be selectively connected to the shaft 63 by a shiftable clutch element 71 splined on the shaft 63 between the gears 66 and 68, opposite ends of which clutch element are provided with clutch teeth adapted to cooperate with similar clutch teeth formed on the adjacent sides of the hub of the gears. The clutch element 71 is normally maintained in an intermediate or neutral position by a pair of springs 72 and 73 but is adapted to be shifted towards the left to drive the shaft 63 from the gear 66 or towards the right to connect the gear 68 with the shaft 63 by electric solenoids 74 and 75, respectively.

The armature of the solenoid 74 is connected to a slidable member 76 provided with an inclined cam slot 77 within which a roller carried by a longitudinally slidable rod 78 engages. The armature of the solenoid 75 is connected to the bar 78 in a manner similar to that in which the armature of the solenoid 74 is connected thereto, except for the fact that the cam slot 80 in the member 81 corresponding to the member 76 is inclined in the opposite direction to the slot 77. The lower ends of the cam slots are widened so that the operation of one of the members 76 and 81 will not be interfered with by the other. The slidable member 78 has a clutch yoke fixed to the right-hand end thereof which engages in a groove formed in the shiftable clutch member 71. The bar 78 is normally held in such a position that the clutch element 71 is in neutral position by the springs 72 and 73 which are located in a cut-out portion of the bar and engage opposite sides of a stationary stop fixed to the frame of the machine.

The left-hand end of the shaft 63 is connected to a gear 82 journaled thereon through the medium of an automatic release overload clutch 83. The gear 82 constitutes the driving gear of change gears, designated generally by the reference character M, the driven gear 84 of which is fixed to the end of the lead screw 53. Adjacent to its right-hand end, the shaft 63 is operatively connected to a spindle feed hand wheel 85, a crank 86 and fixed and adjustable dials, etc., as is known in the art. The mechanism shown per se forms no part of the present invention.

The spindle 17 is adapted to be moved at a rapid rate in either direction by the reversible spindle rapid traverse motor 23 which is continuously connected to the shaft 63 by gears 90 and 91, shaft 92, and bevel gears 93, 94, the latter of which is fixed to the shaft 63.

The reversible feed motor 22 is operatively connected to a horizontally extending shaft 100 rotatably supported in the base A, through the medium of a V-belt drive 101 and spur gears 102 and 103. From the gear 103 the drive is either at a relatively slow or feeding rate through a variable feed change transmission, designated generally by the reference character N, and an overrunning clutch device, designated generally by the reference character O, or at a relatively high or rapid rate through a normally disengaged disk clutch P, a shaft 104, and the overrunning clutch mechanism O. The feed change gears, etc., are housed within a suitable gear box in the base A. Through the medium of the transmission N, the shaft 100 may be rotated at various speeds, and through the medium of the normally disengaged friction clutch P, the driven element of which is carried by a gear 105 continuously in mesh with the gear 103, the shaft 100 may be selectively rotated at a high rate of speed. The gear 103 is keyed to the driven shaft of the feed change transmission N and the gear 105 is journaled on the shaft 104. The driving element of the friction clutch P is splined to the shaft 104, which shaft is in axial alignment with the shaft 100, and is adapted to be actuated to engage the clutch P upon energization of an electrically-operated solenoid 106 connected to one lever of a bell crank lever 107 pivoted on the frame, the other lever of which is connected to a member 108 which in turn actuates the clutch elements.

Figure 4:
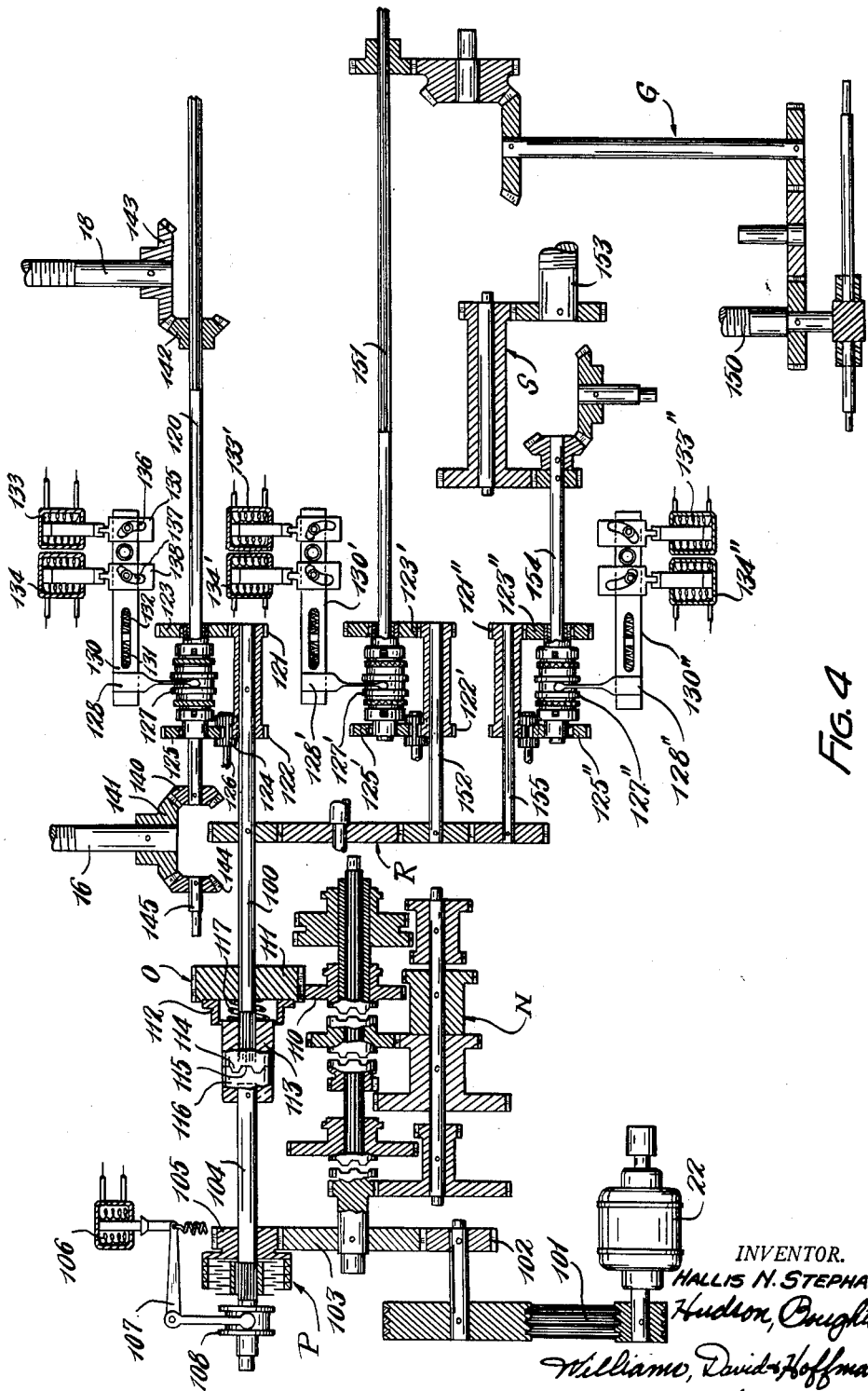
Fig. 4 is a diagrammatic view showing the drive for reciprocating the saddle, table and spindle head.
Figure 6:
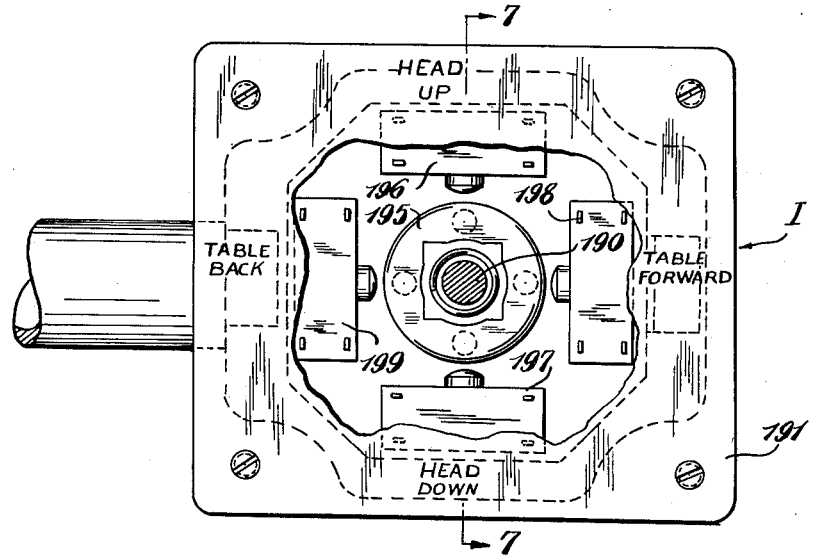
Fig. 6 is an enlarged plan view, with portions broken away and in section, of the portable control station.
Figure 7:
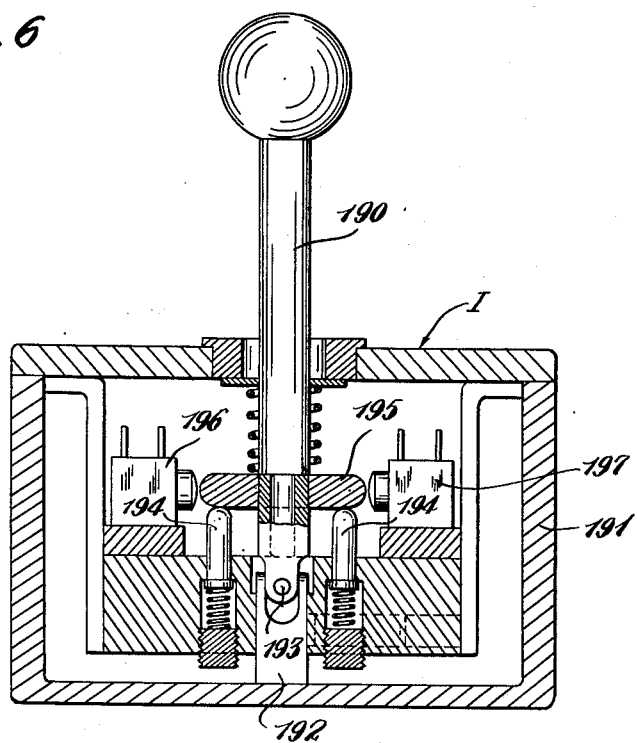
Fig. 7 is a sectional view approximately on the line 7—7 of Fig. 6.
Figure 8:
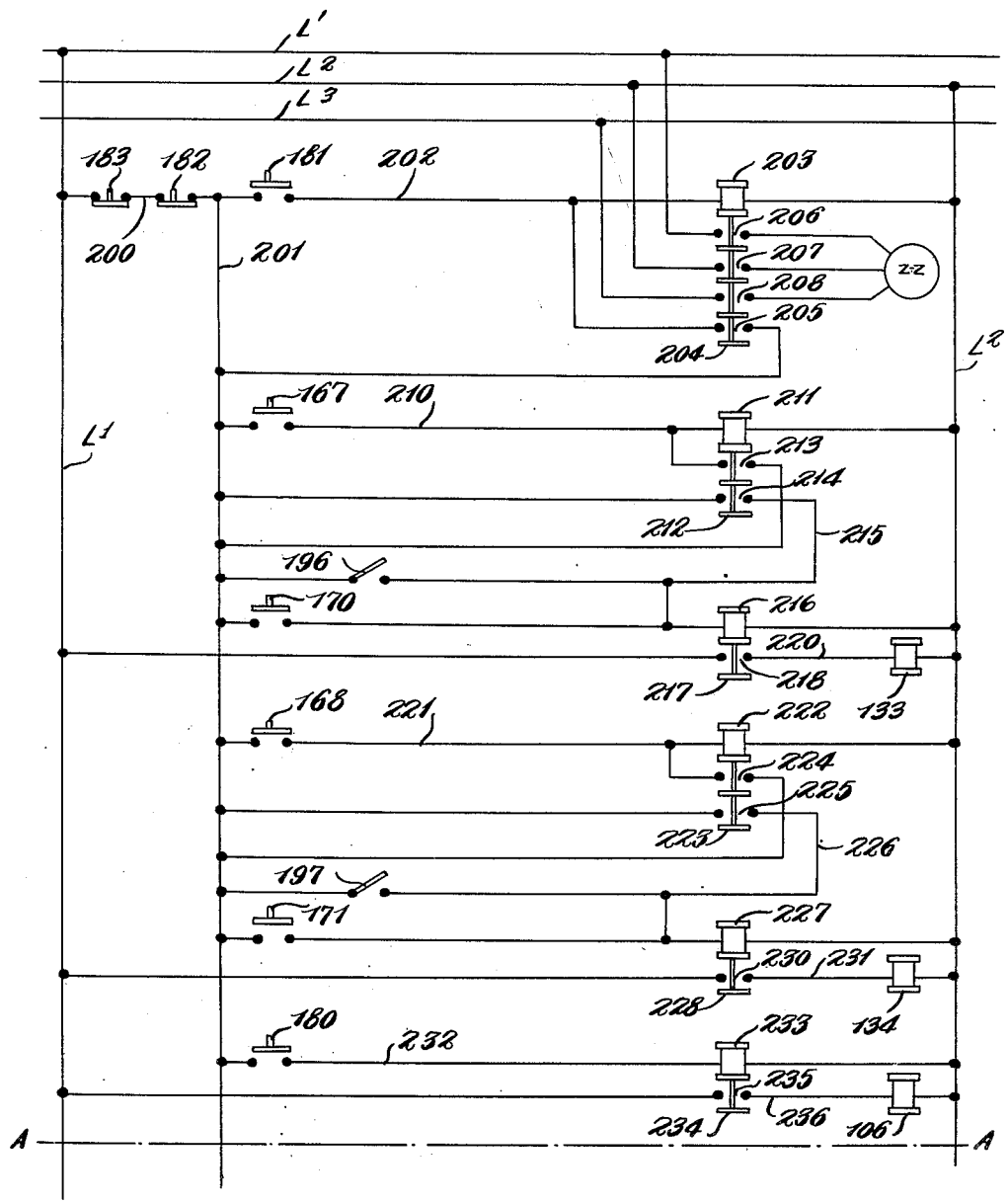
Figs. 8 and 9 are wiring diagrams of the electrical controls for the machine.
Figure 9:
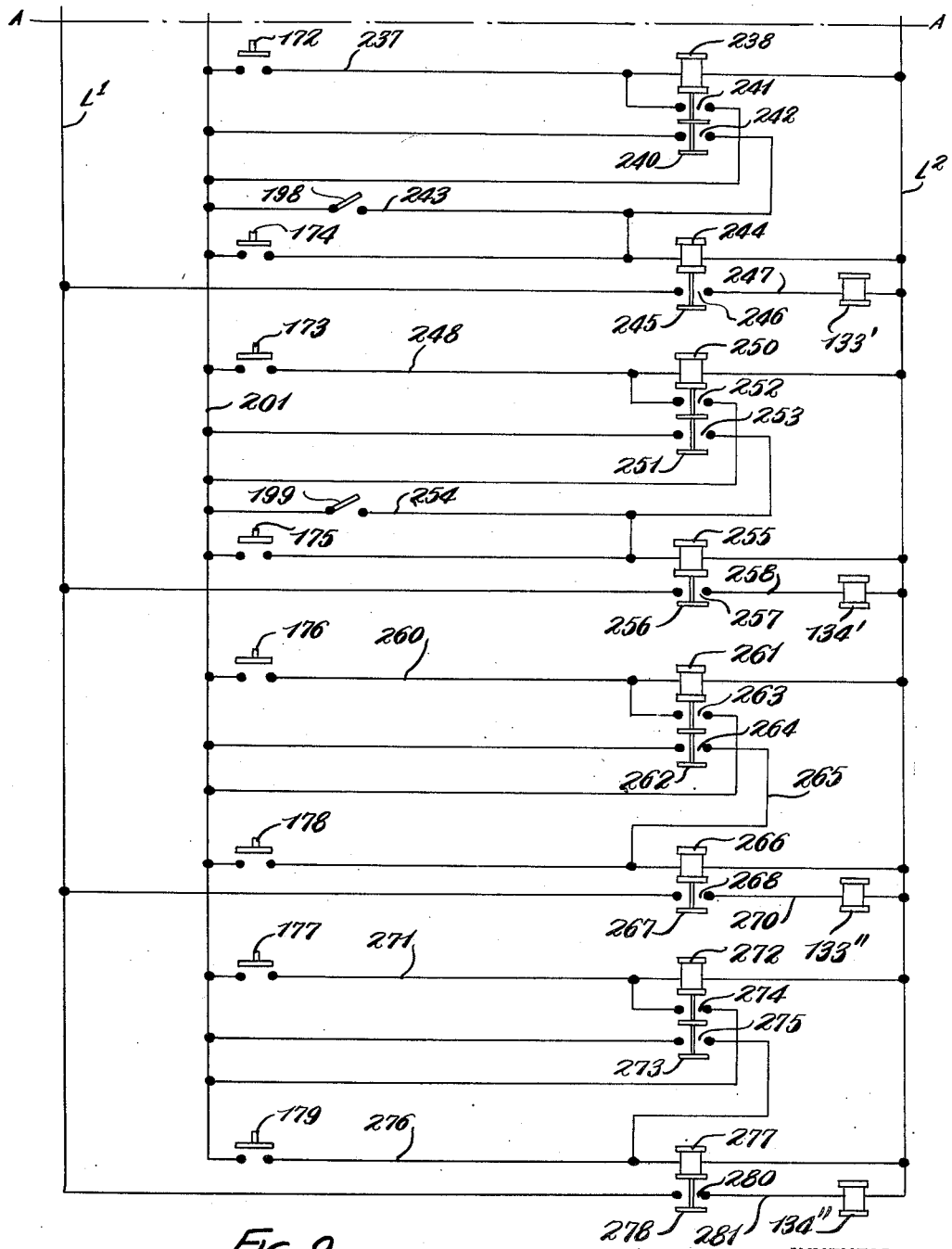

The last or driving gear 110 of the transmission N is continuously in mesh with a gear 111 which forms the low speed element of the overrunning clutch mechanism O. The gear 111 is rotatably supported on the shaft 100 and has formed integral therewith the driving element 112 of a normally engaged toothed clutch, the driven element 113 of which is splined on the shaft 100. The left-hand end of the driven element 113, as viewed in Fig. 4, has a plurality of sloping teeth or cam surfaces 114 which cooperate with similar teeth 115 on a high speed driving member 116 fixed to the right-hand end of the high speed shaft 104. The member 113 is continuously urged towards the left, as viewed in Fig. 4, by a compression spring 117 interposed therebetween and the gear 111. The construction is such that the shaft 100 is normally connected to the transmission N through the normally engaged clutch elements 112 and 113 and the gears 110 and 111, with the shaft 104 rotating at the same speed as the shaft 100 due to the engagement of the teeth 114 and 115.

Upon engagement of the friction clutch P, the shaft 104 is rotated at a higher rate of speed than the shaft 100. This difference in speed causes the teeth 114 of the slidable clutch element 113 to climb the teeth 115 of the element 116 carried by the shaft 104, with the result that the slidable clutch element 113 is moved towards the right, disengaging the teeth thereof from the teeth of the clutch element 112, which in turn disengages the low speed drive. Thereafter, the shaft 100 rotates at the same high speed as the shaft 104. Movement of the member 113 towards the right is limited by the compression spring 117, and the construction is such that the cooperating teeth 114 and 115 are never permitted to clear each other. Both sides of the teeth 114 and 115 are inclined which makes the device operable for either direction of rotation of the motor 22. When the clutch P is released, the spring 117 reengages the cooperating clutch teeth of the clutch elements 112 and 113, and reconnects the feed to the shaft 100 in place of the rapid traverse.

The shaft 100 is adapted to be operatively connected to a horizontal shaft 120 journaled in the base A of the machine and extending substantially the length thereof through the medium of gears 121, 122 of a gear cluster fixed to the shaft 100. The gear 121 is in mesh with a gear 123 and the gear 122 with a gear 124, which latter gear is in turn in mesh with a gear 125. The gear 124 is journaled on a jackshaft 126 and the gear 125 rotates in a direction opposite to the direction of rotation of the gear 123. The gears 123 and 125 are supported coaxially with the shaft 120 being keyed to driven elements of a double friction clutch S of commercial construction.

The particular clutch shown is a "Maxitorq" floating disk, self-locking, double clutch sold by The Carlyle Johnson Machine Company, Manchester, Connecticut, and is shown in Sweet's File for Product Designers for 1944 and is not herein shown and described in detail. Suffice it to say that it comprises a shiftable sleeve member 127 which when shifted to the right causes the shaft 120 to be driven by the gear 123 and when shifted to the left causes the shaft 120 to be driven by the gear 125. The clutch element 127 is provided with a groove within which an operating arm or yoke 128 engages. The arm 128 is fixed to the left-hand end of a slidable bar 130 which is normally maintained in position to hold the clutch element 127 in neutral by compression springs 131, 132 located in a cut-out portion of the bar 130 and abutting against opposite sides of the stationary stop fixed to the frame of the machine.

The bar 130 is adapted to be shifted toward the right to connect the gear 123 to the shaft 120 by an electric solenoid 133 and toward the left to connect the gear 125 to the shaft 120 by an electric solenoid 134. The armature of the solenoid 133 is connected to a slidable member 135 provided with an inclined cam slot 136 within which a roller carried by the slidable bar 130 engages. The armature of the solenoid 134 is connected to the slidable bar 130 in a similar manner except for the fact that the cam slot 137 in the member 138 corresponding to the member 135 is inclined in the opposite direction to the slot 136. The upper ends of the cam slots 136, 137 are widened so that the operation of one of the members 135, 138 will not be interfered with by the other. Opposite ends of the shaft 120 are operatively connected to the lead screws 16, 18 which raise and lower the spindle head and backrest block, respectively, by miter gears 140 and 141, 142 and 143, respectively. The gear 140 is fixed to the left-hand end of the shaft 120 and is continuously in mesh with the gear 141 which is keyed to the lower end of the lead screw 16. The gear 141 is also engaged by a gear 144 fixed to the rear end of a shaft 145 projecting to the front of the machine where it is arranged for the reception of a hand crank, thus providing for manual raising and lowering of the spindle head and backrest column block. The gear 142 is splined to the shaft 120 so as to permit movement of the backrest column D toward and from the spindle head column B.

The table F is reciprocated upon the ways 14 and 15 by a lead screw 150 rotatably supported in the saddle E and in engagement with a cooperating nut fixed to the underside of the table. The lead screw 150 is connected to and driven by a splined shaft 151 extending lengthwise of the bed of the machine by gearing, designated generally by the reference character Q, the particular construction of which gearing forms no part of the present invention. The shaft 151 is adapted to be connected to a short shaft 152 in a manner similar to that in which the shaft 120 is connected to the shaft 100. Suffice it to say that the duplicate parts are designated by the same reference characters with a prime mark affixed thereto. The shaft 152 is in turn operatively connected to the shaft 100 by gearing, designated generally as R.

The saddle E is moved along the ways 12, 13 by a lead screw 153 supported in and extending lengthwise of the bed A and in engagement with a cooperating nut carried by the saddle E. The lead screw 153 is connected to a shaft 154 by gearing, designated generally as S. The shaft 154 is connected to and driven from a shaft 155 in a manner similar to that in which the shaft 120, which raises and lowers the spindle head C is connected to the shaft 100 and will not be described in detail. Suffice it to say that the duplicate parts are designated by the same reference characters with a double prime mark affixed thereto. The shaft 155 is connected to and driven by the shaft 100 by the gearing R.

In operation, after the desired spindle speeds and the desired feed rates have been selected by the speed change transmission J and the feed change transmissions L and N, the remaining operations of the machine are controlled from the electrical control stations H and I. The feed push buttons for the spindle head C, saddle E and table F are arranged in groups and are arranged to give directional control. Each group has two "continuous" feed push buttons and two "inch" feed push buttons. The two "continuous" feed push buttons in each group are provided with electric light bulbs therein which illuminate the push buttons when they are momentarily depressed and remain lighted so long as the feed actuated thereby is in operation. This indicates at a glance to the operator which unit is being fed and in which direction. The controls are preferably so interlocked that the spindle head, saddle or table cannot be fed continuously unless the spindle 17 is rotating.

Rotation of the spindle 17 is controlled by three push button switches 160, 161 and 162. The two upper push button switches 160, 161 cause the spindle to rotate continuously in opposite directions upon being instantaneously depressed. The right-hand push button 160, see Fig. 5, initiates continuous rotation of the spindle in a clockwise direction while the left-hand push button switch 161 initiates continuous rotation of the spindle in the opposite or counterclockwise direction. The lower jog push button switch 162 rotates the spindle in a counterclockwise direction so long as the push button is depressed. The spindle is adapted to fed continuously toward the right by momentarily depressing the spindle continuous feed push button switch 163 and toward the left by momentarily depressing the spindle continuous feed push button switch 164. The spindle is moved at a rapid traverse rate toward the right or left upon either the spindle rapid right or spindle rapid left push button switches 165, 166 being depressed. The movement continues only as long as the push button switches are held depressed.

The spindle head continuous feed and jog feed push button switches are designated by the reference characters 167, 168, 170, 171. Instantaneous actuation of the head continuous feed up push button switch 167 initiates continuous feed movement of the spindle head in an upward direction and actuation of the head continuous feed down push button switch 168 initiates movement of the spindle head in the opposite direction. The head jog push button switches 170, 171 cause "inch" feed movement of the spindle head up and down, respectively. The table continuous feed and jog feed forward and back push button switches are designated by the reference characters 172, 173 and 174, 175, respectively. Instantaneous actuation of the table continuous feed forward push button switch 172 initiates continuous feed movement of the table toward the front and actuation of the table continuous feed back push button switch 173 initiates movement of the table toward the back of the machine. The push button switches 174, 175 cause "inch" feed movement of the table forward and back, respectively. The saddle continuous feed and jog push button switches are designated by the reference characters 176, 177 and 178, 179, respectively. Instantaneous actuation of the saddle continuous feed right push button switch 176 initiates continuous feed movement of the saddle toward the right and actuation of the saddle continuous feed left push button switch 177 initiates continuous feed movement of the saddle toward the rear. The push button switches 178, 179 cause "inch" feed movement of the saddle toward the right and left, respectively. Rapid movement of the spindle head, saddle and table is controlled by a push button switch 180. When the push button switch 180 is depressed, any or all of the feed movements of the spindle head, saddle or table operating at that time are continued but at a rapid traverse rate so long as the push button switch 180 is held depressed. In addition to the push button switches mentioned above, the pendant control station H comprises a start feed motor push button switch 181 for the feed motor 22, a stop all feeds push button switch 182 and a stop all switch 183. The latter switch stops all operations of the machine.

One of the objects of the present invention, previously referred to, is the provision of a novel and improved machine of the character herein shown and described comprising a single control element supported for universal angular movement and operative to control the feed movement of two machine tool elements reciprocable in directions at right angles to each other. In the embodiment of the invention shown, the single control element is the manually operable lever 190 projecting through an enlarged opening in the housing 191 of the movable control station I and operatively connected within the housing to a centrally located boss 192 projecting from the bottom of the housing by a universal joint 193. The lever 190 is normally maintained in an upright position; that is, normal to the side of the housing 191 through which it projects by four spring-pressed detents 194 equally spaced thereabout and engaging the underside of an annular member 195 carried by the lever 190. The portable control station I also comprises four double throw snap switches 196, 197, 198, 199 equally spaced about the member 195 and adapted to be actuated thereby when the normally operable lever 190 is moved out of its normal position.

In the embodiment shown, the vertical feed movement of the spindle head C and the forward and back horizontal feed movement of the table F may be controlled from the portable control station I and the switches 196, 197, 198, 199 are connected in the control circuits which effect the feed movements of these machine tool elements in a manner hereinafter described. It is to be understood, however, that the movement of any two or more of the movable machine tool elements could be controlled from the portable control station I. It is also to be understood that the control station I need not be portable but that it could be fixed to any desired part of the machine; for example, the spindle head C. Alternatively, the control station I could be incorporated in the pendant control station H.

Referring again to the embodiment shown, the switches 196, 197 are located on opposite sides of the operating lever 190 and control the "up" and "down" movements of the spindle head C, respectively. In a similar manner, the switches 198, 199 control "forward" and "back" movements of the table F. When the control lever 190 is moved toward the indicia "Head Up," the spindle head C is caused to feed in an upward direction. Movement of the lever 190 in the opposite direction; that is, toward the "Head Down" indicia, causes the spindle head to be fed in a downward direction. Movement of the lever 190 to the right or left; that is, toward the "Table Forward" or "Table Back" indicia, causes the table F to feed forward or back, respectively. Two feed movements can be effected simultaneously by moving the control lever 190 to a position intermediate two of the indicia referred to, in which position it actuates the two adjacent switches. The construction is such that it is not necessary to return the control lever 190 to its normal or central position before being moved to effect an additional or a different feed movement if the second or new feed movement position of the control lever 190 is adjacent to the first feed movement position.

*Operation*

The operation of the machine will now be described with reference to the wiring diagram. Since the particular manner of controlling the spindle rotation and the feed and rapid traverse movements of the spindle in the spindle head forms no part of the present invention, this part of the control for the machine is not herein illustrated and described. Suffice it to say that the various operations previously referred to can be effected by pressing the proper push button switches 160 to 166. The continuous movements, once initiated, can be stopped by pushing one or the other of the stop push button switches 182, 183 as the circumstances require.

The feed motor 22 which supplies the power for feeding the spindle head C, saddle E and table F in the desired direction, commonly referred to as the milling feeds, normally operates continuously in the same direction and is started by momentarily depressing the start feed motor push button switch 181. This establishes a circuit from the line L–1 through the stop all push button switch 183, wire 200, stop all feeds push button switch 182, wire 201, start feed motor push button switch 181, wire 202, operating solenoid 203 of feed forward contactors 204 to L–2.

Energization of the operating solenoid 203 of the feed forward contactor 204 closes the normally open contacts 205, 206, 207, 208 thereof. The closing of normally open contacts 205 establishes a holding circuit for the operating solenoid 203 after the start feed motor push button switch 181 is released. The closing of normally open contacts 206, 207, 208 of feed forward contactors 204 connects the motor to the power lines L–1, L–2 and L–3 and the motor thereafter rotates in the forward direction until either the stop all feeds push button switch 182 or stop all push button switch 183 is depressed or one of the overtravel limit switches, etc., not shown, is opened.

With the feed motor 22 operating, the pairs of gears 123, 125 and 123', 125' and 123" and 125" rotatably supported on shafts 120, 151 and 154, respectively, are driven with the gears of each pair rotating in opposite directions. As previously explained, these gears are adapted to be selectively connected to the shaft upon which they are supported and, in turn, feed the machine tool element moved thereby in the desired direction by the shiftable clutch elements 127, 127' and 127" under the control of the clutch operating solenoids 133, 134 and 133', 134' and 133", 134", respectively, the energization and de-energization of which solenoids are controlled from the pendant and portable control stations H and J, respectively.

Referring first to the control as it is effected from the pendant control station H as distinguished from the portable control station I, which will be referred to later, the spindle head C is caused to feed "up" continuously by momentarily depressing the head continuous feed up push button switch 167, closing the normally open contacts thereof. This establishes a circuit from the line L–1 through the stop all push button switch 183, wire 200, stop all feeds push button switch 182, wire 201, normally open contacts of head continuous feed up push button switch 167, which contacts are now closed, wire 210, operating solenoid 211 of head feed up control relay 212 to line L–2 actuating relay 212, closing its normally open contacts 213, 214. The closing of normally open contacts 213 establishes a holding circuit for the head continuous feed up control relay 212 from the wire 201 to the wire 210. The closing of the normally open contacts 214 of relay 212 establishes a circuit from the wire 201 through the contacts 214, which are now closed, wire 215, operating solenoid 216 of head feed up relay 217 to the line L–2. Actuation of head feed up relay 217 closes the normally open contacts 218 thereof establishing a circuit from the line L–1 through normally open contacts 218, which are now closed, wire 220, and the head feed up solenoid 133 to line L–2.

Energization of the head feed up solenoid 133 shifts the clutch element 127 into engagement with the clutch element on the hub of the gear 123 causing the shaft 120 to be rotated in a direction to raise the spindle head C at a feed rate. The head continues to feed up until the holding circuit for head feed up control relay 212 is broken by the operator depressing the stop all feeds push button switch 182 or the stop all push button switch 183 or upon the opening of an interlock or an overtravel limit switch, not shown. It is to be understood that suitable interlocks and overtravel limit switches are employed to prevent attempted actuation in two directions at one time, etc. as is customary in machines of this character. These controls, however, are omitted from the wiring diagram, etc. for purposes of simplicity.

The spindle head C is caused to feed down continuously by momentarily depressing the head continuous feed down push button switch 168 closing the normally open contacts thereof. This establishes a circuit from the line L–1 through the stop all push button swich 183, wire 200, stop all feeds push button switch, wire 201, normally open contacts of head continuous feed down push button switch 168, which contacts are now closed, wire 221, operating solenoid 222 of head feed down control relay 223 to line L–2, actuating relay 223, closing its normally open contacts 224, 225. The closing of normally open contacts 224 establishes a holding circuit for the head continuous feed down control relay 223 from the wire 201 to the wire 221. The closing of normally open contacts 225 of relay 223 establishes a circuit from the wire 201 through the contacts 225, which are now closed, wire 226, operating solenoid 227 of head feed down relay 228 to the line L–2. Actuation of head feed down relay 228 closes the normally open contacts 230 thereof establishing a circuit from the line L–1 through normally open contacts 230, which are now closed, wire 231, and the head feed down solenoid 134 to L–2. Energization of the head feed down solenoid 134 shifts the clutch element 127 into engagement with the clutch element on the hub of the gear 125 causing the shaft 120 to be rotated in a direction to lower the spindle head C at a feed rate. The head continues to feed down until the holding circuit for head feed down control relay 223 is broken by the operator depressing the stop all feeds push button switch 182 or the stop all push button switch 183 or upon the actuation of an interlock, not shown.

With the continuous feed operating in either direction, the movement of the spindle head can be continued in whichever direction it is operating but at a rapid traverse rate by the operator depressing the rapid movement push button switch 180 to close the normally open contacts thereof. This establishes a circuit from the line L–1 through the stop all push button switch 183, wire 200, stop all feed push button switch 182, wire 201, normally open contacts of rapid movement push button switch 180, which are now closed, wire 232, operating solenoid 233 of rapid movement relay 234 to L–2 causing the relay to operate and close its normally open contacts 235. This establishes a circuit from the line L–1 through normally open contacts 235, which are now closed, wire 236, and operating solenoid 106 for clutch P to L–2 energizing operating solenoid 106 engaging the clutch P, causing operation of the high speed shaft 104 which drives the shaft 100 and in turn the lead screw 16 at a rapid traverse rate in a manner previously described.

The spindle head C may be jog fed in an upward direction by depressing the head jog feed up push button switch 170 to close the normally open contacts thereof, which contacts are in parallel circuit with the normally open contacts 214 of head continuous feed up control relay 212. When push button switch 170 is depressed to close its contacts, a circuit is established from the wire 201 through the normally open contacts of head jog feed up push button switch 170, wire 215 and operating solenoid 216 of head feed up relay 217 to line L–2. The actuation of head feed up relay 217 closes the normally open contacts 218 energizing the head feed up solenoid 133 in a manner previously described, thus shifting the clutch element 127 into engagement with the clutch element on the hub of the gear 123 causing the shaft 120 to rotate and the head C to feed in an upward direction. The up movement of the head continues so long as the head jog feed up push button switch 170 is held depressed.

The spindle head C may be jog fed in a down direction by depressing the head jog feed down push button switch 171 to close the normally open contacts thereof, which contacts are in parallel circuit with the normally open contacts 225 of head continuous feed down control relay 223. When push button switch 171 is depressed to close its contacts, a circuit is established from the wire 201 through the normally open contacts of head jog feed down push button switch 171, wire 226 and operating solenoid 227 of head feed down relay 228. The actuation of head feed down relay 228 closes the normally open contacts 230 energizing the head feed down solenoid 134 in a manner previously described, thus shifting the clutch element 127 into engagement with the clutch element on the hub of the gear 125 causing the shaft 120 to rotate and the head C to feed in a downward direction. The down movement of the head continues so long as the head jog feed down push button switch 171 is held depressed.

Continuous feed of the table F in a forward direction is initiated by momentarily depressing the table continuous feed forward push button switch 172, closing the normally open contacts theerof. This establishes a circuit from the line L–1 through the stop all push button switch 183, wire 200, stop all feeds push button switch 182, wire 201, normally open contacts of table continuous feed forward push button switch 172, which contacts are now closed, wire 237, operating solenoid 238 of table feed forward control relay 240 to line L–2 actuating relay 240, closing its normally open contacts 241, 242. The closing of normally open contacts 241 establishes a holding circuit for the table continuous feed forward control relay 240 from the wire 201 to the wire 237. The closing of the normally open contacts 242 of relay 240 establishes a circuit from the wire 201 through the contacts 242, which are now closed, wire 243, operating solenoid 244 of table feed forward relay 245 to the line L–2. Actuation of table feed forward relay 245 closes the normally open contacts 246 thereof establishing a circuit from the line L–1 through normally open contacts 246, which are now closed, wire 247, the table feed forward solenoid 133' to L–2. Energization of the table feed forward solenoid 133' shifts the clutch element 127' into engagement with the clutch element on the hub of the gear 123' causing the shaft 151 to be rotated in a direction to move the table F forward. The table continues to feed forward until the holding circuit for table feed forward control relay 240 is broken by the operator depressing the stop all feeds push button switch 182 or the stop all push button switch 183 or upon the opening of an interlock, not shown.

The table F is caused to feed back continuously by momentarily depressing the table continuous feed back push button switch 173 closing the normally open contacts thereof. This establishes a circuit from the line L–1 through the stop all push button switch 183, wire 200, stop all feeds push button switch 182, wire 201, normally open contacts of table continuous feed back push button switch 173, which contacts are now closed, wire 248, operating solenoid 259 of table feed back control relay 251 to line L–2, actuating relay 251, closing its normally open contacts 252, 253. The closing of normally open contacts 252 establishes a holding circuit for the table continuous feed back control relay 251 from the wire 201 to the wire 248. The closing of normally open contacts 253 of relay 251 establishes a circuit from the wire 201 through the contacts 253, which are now closed, wire 254, operating solenoid 255 of table feed back relay 256 to the line L-2. Actuation of table feed back relay 256 closes the normally open contacts 257 thereof establishing a circuit from the line L-1 through normally open contacts 257, which are now closed, wire 258, the table feed back solenoid 134' to L-2. Energization of the table feed back solenoid 134' shifts the clutch element 127' into engagement with the clutch element on the hub of the gear 125' causing the shaft 151 to be rotated in a direction to move the table back at a feed rate. The table continues to feed back until the holding circuit for table feed back control relay 251 is broken by the operator depressing the stop all feeds push button switch 182 or the stop all push button switch 183 or upon the actuation of an interlock, not shown.

With the continuous feed operating in either direction, the movement of the table can be continued in whichever direction it is operating but at a rapid traverse rate by the operator depressing the rapid movement push button switch 180 to close the normally open contacts thereof. This energizes the operating solenoid 186 and engages the clutch P in a manner previously described.

The table may be jog fed in a forward direction by depressing the table jog feed forward push button switch 174 to close the normally open contacts thereof, which contacts are in parallel circuit with the normally open contacts 242 of table continuous feed forward control relay 240. When push button switch 174 is depressed to close its contacts, a circuit is established from the wire 201 through the normally open contacts of table jog feed forward push button switch 174, wire 243 and operating solenoid 244 of table feed forward relay 245 to line L-2. The actuation of table feed forward relay 245 closes the normally open contacts 246 energizing the table feed forward solenoid 133' in a manner previously described, thus shifting the clutch element 127' into engagement with the clutch element on the hub of the gear 123' causing the shaft 151 to rotate and the table F to feed in a forward direction. The forward movement of the table continues so long as the table jog feed forward push button switch 174 is held depressed.

The table may be jogged in a back direction by depressing the table jog feed back push button switch 175 to close the normally open contacts thereof, which contacts are in parallel circuit with the normally open contacts 253 of table continuous feed back control relay 251. When push button switch 175 is depressed to close its contacts, a circuit is established from the wire 201 through the normally open contacts of table jog feed back push button switch 175, wire 254 and operating solenoid 255 of table feed back relay 256. The actuation of table feed back relay 256 closes the normally open contacts 257 energizing the table feed back solenoid 134' in a manner previously described, thus shifting the clutch element 127' into engagement with the clutch element on the hub of the gear 125' causing the shaft 151 to rotate and the table F to feed in a backward direction. The back movement of the table continues so long as the table jog feed back push button switch 175 is held depressed.

Continuous feed of the saddle E toward the right is initiated by momentarily depressing the saddle continuous feed right push button switch 176, closing the normally open contacts thereof. This establishes a circuit from the line L-1 through the stop all push button switch 183, wire 200, stop all feeds push button switch 182, wire 201, normally open contacts of saddle continuous feed right push button switch 176, which contacts are now closed, wire 260, operating solenoid 261 of saddle feed right control relay 262 to line L-2 actuating relay 262, closing its normally open contacts 263, 264. The closing of normally open contacts 263 establishes a holding circuit for the saddle continuous feed right control relay 262 from the wire 201 to the wire 260. The closing of the normally open contacts 264 of relay 262 establishes a circuit from the wire 201 through the contacts 264, which are now closed, wire 265, operating solenoid 266 of saddle feed right relay 267 to the line L-2. Actuation of saddle feed right relay 267 closes the normally open contacts 268 thereof establishing a circuit from the line L-1 through normally open contacts 268, which are now closed, wire 270, and the saddle feed right solenoid 133" to L-2. Energization of the saddle feed right solenoid 133" shifts the clutch element 127" into engagement with the clutch element on the hub of the gear 123" causing the shaft 154 to be rotated in a direction to move the saddle E toward the right. The saddle continues to feed right until the holding circuit for saddle feed right control relay 262 is broken by the operator depressing the stop all feeds push button switch 182 or the stop all push button switch 183 or upon the opening of an interlock, not shown.

The saddle E is caused to feed left continuously by momentarily depressing the saddle continuous feed left push button switch 177 closing the normally open contacts thereof. This establishes a circuit from the line L-1 through the stop all push button switch 183, wire 200, stop all feeds push button switch 182, wire 201, normally open contacts of saddle continuous feed left push button switch 177, which contacts are now closed, wire 271, operating solenoid 272 of saddle feed left control relay 273 to line L-2, actuating relay 273, closing its normally open contacts 274, 275. The closing of normally open contacts 274 establishes a holding circuit for the saddle continuous feed left control relay 273 from the wire 201 to the wire 271. The closing of normally open contacts 275 of relay 273 establishes a circuit from the wire 201 through the contacts 275, which are now closed, wire 276, operating solenoid 277 of saddle left relay 278 to the line L-2. Actuation of saddle feed left relay 278 closes the normally open contacts 280 thereof establishing a circuit from the line L-1 through normally open contacts 280, which are now closed, wire 281, and the saddle feed left solenoid 134" to L-2. Energization of the saddle feed left solenoid 134" shifts the clutch element 127" into engagement with the clutch element on the hub of the gear 125" causing the shaft 154 to be rotated in a direction to move the saddle toward the left at a feed rate. The saddle continues to feed left until the holding circuit for saddle feed left control relay 273 is broken by the operator depressing the stop all feeds push button switch 182 or the stop all push button switch 183 or upon the actuation of an interlock, not shown.

With the continuous feed operating in either direction, the movement of the saddle can be continued in whichever direction it is operating but at a rapid traverse rate by the operator depressing the rapid movement push button switch 180 to close the normally open contacts thereof and engage the clutch P.

The saddle may be jog fed in a right-hand direction by depressing the saddle jog feed right push button switch 178 to close the normally open contacts thereof, which contacts are in parallel circuit with the normally open contacts 263 of saddle continuous feed right control relay 262. When push button switch 178 is depressed to close its contacts, a circuit is established from the wire 201 through the normally open contacts of saddle jog feed right push button switch 178, wire 265 and operating solenoid 266 of saddle feed right relay 267 to line L-2. The actuation of saddle feed right relay 267 closes the normally open contacts 268 energizing the saddle feed right solenoid 133" in a manner previously described, thus shifting the clutch element 127" into engagement with the clutch element on the hub of the gear 123" causing the shaft 154 to rotate and the saddle E to feed towards the right. The movement of the saddle toward the right continues so long as the saddle jog feed right push button switch 178 is held depressed.

The saddle may be jogged in a left direction by depressing the saddle jog feed left push button switch 179 to close the normally open contacts thereof, which contacts are in parallel circuit with the normally open contacts 275 of saddle continuous feed left control relay 273. When push button switch 179 is depressed to close its contacts, it establishes a circuit from the wire 201 through the normally open contacts of saddle jog feed left push button switch 179, wire 276 and operating solenoid 277 of saddle feed left relay 278 to line L-2. The actuation of saddle feed left relay 278 closes the normally open contacts 280 energizing the saddle feed left solenoid 134" in a manner previously described, thus shifting the clutch element 127" into engagement with the clutch element on the hub of the gear 125" causing the shaft 154 to rotate and the saddle E to feed in a left-hand direction. The left-hand movement of the saddle continues so long as the saddle jog feed left push button switch 179 is held depressed to energize the operating solenoid 166 to engage the clutch P in the manner previously described. The rapid traverse movement continues so long as the rapid movement push button switch 180 is depressed.

The switches 196, 197, 198 and 199 which are located in the portable control station I have both normally open and normally closed contacts but the normally closed contacts which are interlock contacts will be disregarded. Suffice it to say that the normally open contacts are in parallel circuit with the corresponding jog feed push button switch for the same machine tool element and the interlock or normally closed contacts which open upon the closing of the normally open contacts interrupt or stop the corresponding continuous feed if it happens to be operating at the time the control lever 190 is moved to close the normally open contacts.

Referring to the wiring diagram, the head up switch 196 is in parallel circuit with the head jog feed up push button switch 170 across the wires 201 and 215 and upon the closing thereof by manipulation of the control lever 190 by the operator a circuit is established from the line L-1 through the stop all push button switch 183, wire 200, stop all feeds push button switch 182, wire 201, switch 196, which is now closed, wire 215, operating solenoid 216 of head feed up relay 217 to line L-2. The actuation of head feed up relay 217 closes the normally open contacts 218 energizing the head feed up solenoid 133 in a manner previously described, thus shifting the clutch element 127 into engagement with the clutch element on the hub of the gear 123 causing the shaft 129 to rotate and the head C to feed in an upward direction. The up movement of the head continues so long as the head feed up switch 196 is held depressed.

The head may be moved down by manipulating the control lever 190 to close head down switch 197. This switch is in parallel circuit with the normally open contacts of head jog feed down push button switch 171 and when closed establishes a circuit from the wire 201 through head down switch 197, wire 226 and operating solenoid 227 of head feed down relay 228. The actuation of head feed down relay 228 closes the normally open contacts 230 energizing the head feed down solenoid 134 in a manner previously described, thus shifting the clutch element 127 into engagement with the clutch element on the hub of the gear 125 causing the shaft 129 to rotate and the head C to feed in a downward direction. The down movement of the head continues so long as the head down switch 197 is held closed.

The table may be moved in a forward direction by moving the control lever 190 to a position to close the table forward switch 198, which switch is in parallel circuit with the table jog feed forward push button switch 198. When the table forward switch 198 is closed, it establishes a circuit from the wire 201 through its normally open contacts, which are now closed, wire 243 and operating solenoid 244 of table feed forward relay 245 to line L-2. The actuation of table feed forward relay 245 closes the normally open contacts 246 energizing the table feed forward solenoid 133' in a manner previously described, thus shifting the clutch element 127' into engagement with the clutch element on the hub of the gear 123' causing the shaft 151 to rotate and the table F to feed in a forward direction. The forward movement of the table continues so long as the table forward switch 198 is held closed.

The table may be moved in a back direction by moving the control lever 190 in a direction to close the table back switch 199, which switch is in parallel circuit with the table jog feed back push button switch 175. When the switch 199 is closed, it establishes a circuit from the wire 201 through table back switch 199, wire 254 and operating solenoid 255 of table feed back relay 256. The actuation of table feed back relay 256 closes the normally open contacts 257 energizing the table feed back solenoid 134' in a manner previously described, thus shifting the clutch element 127' into engagement with the clutch element on the hub of the gear 125' causing the shaft 151 to rotate and the table F to move in a backward direction. The back movement of the table continues so long as the table back switch 199 is held closed.

From the foregoing it will be apparent that the objects of the invention heretofore enumerated and others have been accomplished and that there has been provided a novel and improved machine tool and particularly a combined boring, drilling and milling machine having two machine tool elements movable relative to each other in directions at right angles and a single control member mounted for universal movement about an axis and capable of controlling the relative movement between the two machine elements such that the machine tool elements move relative to each other in the direction or the approximate direction that the control member is moved.

While the preferred embodiment of the invention has been described with considerable detail, the invention is not limited to the particular construction shown and it is my intention to cover hereby all adaptations, modifications and uses thereof which come within the practice of those skilled in the art to which the invention relates and the scope of the appended claims.

Having thus described my invention, I claim:

1. In a machine tool having a plurality of separably movable machine tool elements and power actuators for moving said machine tool elements in opposite directions individually of each other, a portable control station including a portable housing, a manually operable control member supported in said housing of said portable control station for universal movement in two directions, means for biasing said manually operable control member to a central position, a plurality of electric switches for selectively controlling the operation of said power actuators to selectively move said machine tool elements in selected directions, means for connecting said last-named plurality of electric switches in said housing of said portable control station concentrically of said manually operable control member for selective actuation by movement of said control member, and a flexible electric cable interconnecting said last-named plurality of electric switches and said power actuators.

2. In a machine tool having a plurality of separably movable machine tool elements and power actuators for reciprocating said machine tool elements in opposite directions individually along linear paths at right angles to each other, a pendant control station, a plurality of manually operable electric switches on said pendant control station for selectively controlling the operation of said power actuators to selectively move said machine tool elements in selected directions, and a portable control station including a portable housing, a manually operable control member supported in said housing of said portable control station for universal movement in two directions, means for biasing said manually operable control member to a central position, a plurality of electric switches for controlling the operation of said power actuators to selectively move said machine tool elements in selected directions, means for connecting said last-named plurality of electric switches in said housing of said portable control station concentrically of said manually operable control member for selective actuation upon movement of said control member, and a flexible electric cable interconnecting said last-named plurality of electric switches and said power actuators.

3. In a combined horizontal boring, drilling and milling machine of the character described having a bed provided with a vertical column adjacent to one end, a member slidably supported on said bed, a second member slidably supported on said first member, a third member slidably supported for vertical movement along said vertical column, a spindle rotatably supported in said third member and a plurality of power actuators for independently reciprocating a plurality of said members in opposite directions at right angles to each other, a pendant control station, a plurality of manually operable electric switches on said pendant control station for selectively controlling the operation of said power actuators to selectively move said members in selected directions, a portable control station including a portable housing, a manually operable control member supported in said housing of said portable control station for universal movement in two directions, means for biasing said manually operable control member to a central position, a plurality of electric switches for controlling the operation of said power actuators to selectively move said members in selected directions, means for connecting said last-named plurality of electric switches in said housing of said portable control station concentrically of said manually operable control member for selective actuation upon movement of said control member, and a flexible electric cable interconnecting said last-named plurality of electric switches and said power actuators.

References Cited in the file of this patent

UNITED STATES PATENTS

| Number | Name | Date |
|---|---|---|
| 1,840,853 | Shaw et al. | Jan. 12, 1932 |
| 2,251,015 | Gallimore | July 29, 1941 |
| 2,350,174 | Lucas et al. | May 30, 1944 |